Dec. 10, 1963  L. J. HALL  3,113,411
MOBILE WEED AND BRUSH CUTTER
Filed Feb. 19, 1960  3 Sheets-Sheet 1
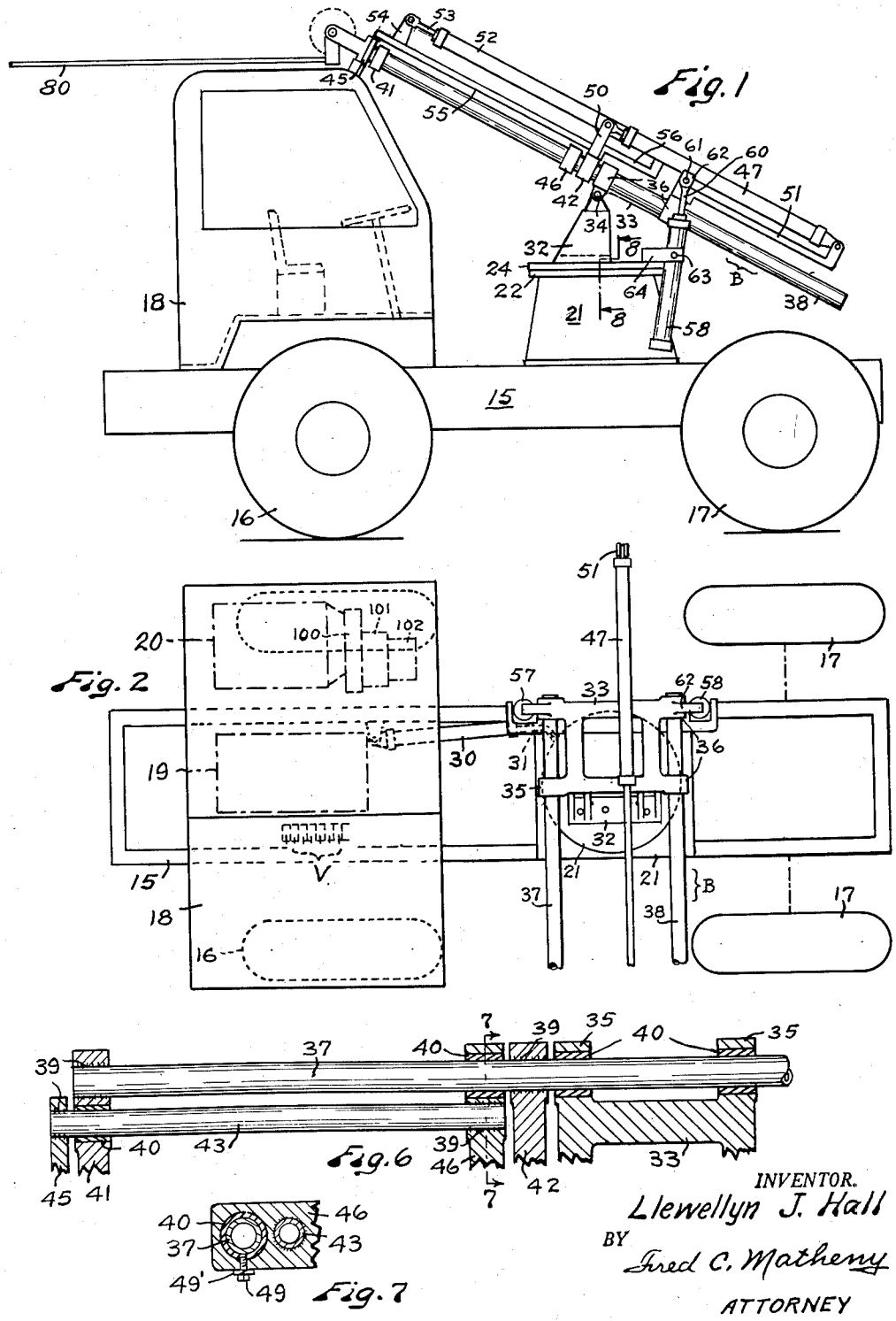
INVENTOR.
Llewellyn J. Hall
BY
Fred C. Matheny
ATTORNEY Dec. 10, 1963  L. J. HALL  3,113,411
MOBILE WEED AND BRUSH CUTTER
Filed Feb. 19, 1960  3 Sheets-Sheet 2
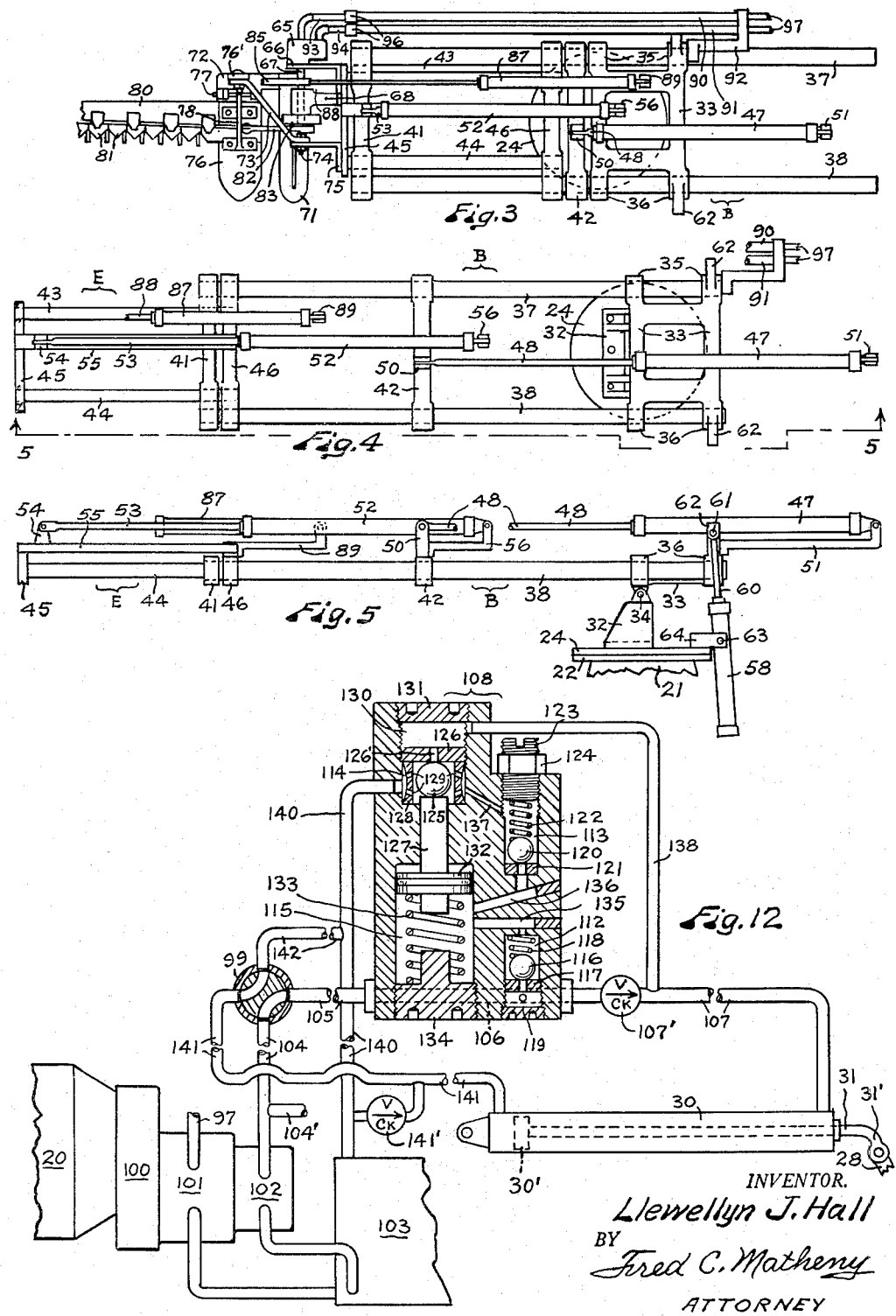
INVENTOR.
Llewellyn J. Hall
BY Fred C. Matheny
ATTORNEY Dec. 10, 1963 L. J. HALL 3,113,411
MOBILE WEED AND BRUSH CUTTER
Filed Feb. 19, 1960 3 Sheets-Sheet 3
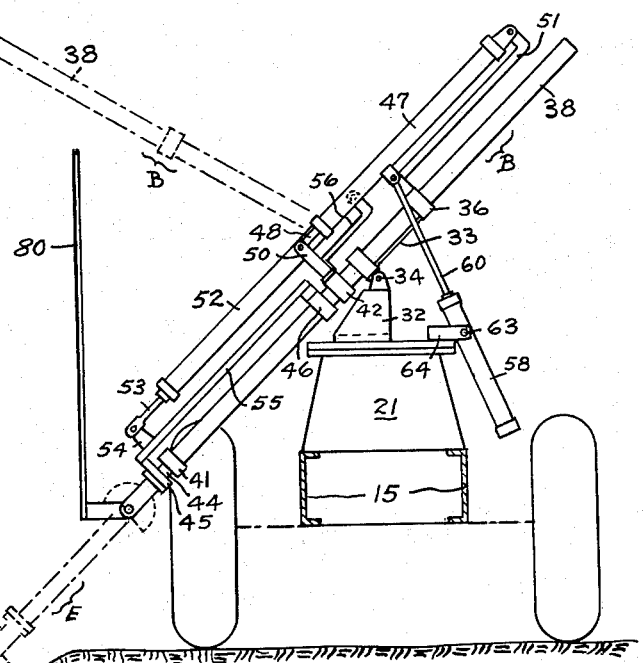
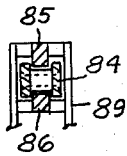
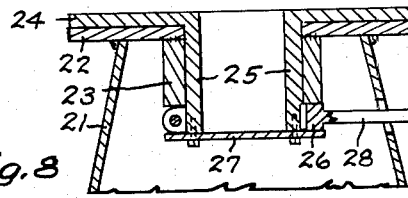
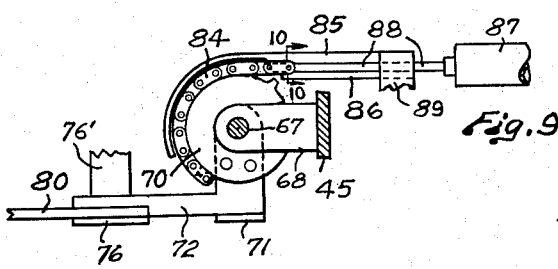
INVENTOR.
Llewellyn J. Hall
BY
Fred C. Matheny
ATTORNEY

United States Patent Office 3,113,411
Patented Dec. 10, 1963

3,113,411
MOBILE WEED AND BRUSH CUTTER
Llewellyn J. Hall, P.O. Box 191, Sedro Woolley, Wash.
Filed Feb. 19, 1960, Ser. No. 9,855
1 Claim. (Cl. 56—25)

My invention relates to a weed and brush cutting machine of the type disclosed in Patents No. 2,588,002; 2,588,003; and 2,588,004, issued to Earl W. Holmes on March 4, 1952.

An object of my invention is to simplify and reduce the cost of construction of machines of this type and to render the same more compact and easier to handle and more efficient in operation.

Another object is to improve and simplify the boom structure by which a cutter bar and sickle assembly is carried so as to provide a boom having a long horizontal and vertical reach and a relatively great angle of vertical swing and one which will fold compactly on a truck type chassis for transportation purposes.

Another object is to provide a machine of this type comprising a horizontal turntable rotatively supported on a mobile vehicle frame, a main boom member vertically tiltably mounted on said turntable, an extension boom member slidably and adjustably carried by the outer end portion of said main boom member and telescopic relative to said main boom member, and a sickle bar and sickle assembly pivotally mounted for tilting movement in a vertical plane on the outer end portion of the extension boom member.

Another object is to provide improved hydraulic means for actuating the moving parts of this weed and brush cutter and particularly improved hydraulic means for permitting rearward swinging or break-away movement of the sickle bar in the event said sickle bar encounters an obstruction, said break-away movement allowing a limited amount of forward movement of the vehicle chassis after the sickle bar assembly has been stopped by the obstruction.

Another object is to provide a machine of this type in which a cutter sickle assembly can be quickly and easily adjusted by hydraulic means into a great many different cutting positions, including a position for trimming tree branches high overhead and a downwardly inclined position for trimming a bank which slopes downwardly at a sharp angle from a roadbed.

Other objects of my invention will be apparent from the following description and accompanying drawings.

In the drawings:

FIG. 1 is a side elevation of a weed and brush cutter constructed in accordance with my invention showing a boom in a folded position extending longitudinally of the machine and showing a sickle bar and sickle assembly extending rearwardly over the cab of a truck type mobile vehicle on which the machine is mounted, the vehicle and sickle bar and sickle assembly being diagrammatically shown.

FIG. 2 is a top plan view of the machine shown in FIG. 1 with the boom extending sidewise therefrom, parts of said boom being broken away.

FIG. 3 is a detached plan view of the boom and the top disc of the turntable and parts of a sickle bar and sickle assembly, showing the boom telescopically shortened to its minimum length.

FIG. 4 is a detached plan view of the boom structure shown in FIG. 1 as it would appear when extended to its maximum length and with the sickle bar and sickle assembly omitted.

FIG. 5 is a view in side elevation of the fully extended boom, looking in the direction indicated by broken line 5—5 of FIG. 4.

FIG. 6 is a fragmentary view, partly in plan and partly in section and on a larger scale than the preceding figures, illustrating the construction of the boom.

FIG. 7 is a sectional view taken on broken line 7—7 of FIG. 6.

FIG. 8 is an enlarged fragmentary sectional view taken substantially on broken line 8—8 of FIG. 1 and showing turntable construction.

FIG. 9 is an enlarged fragmentary elevational view showing parts of a sickle bar and sickle assembly together with a sprocket wheel segment and guided roller chain used for swingingly adjusting the sickle bar assembly in a vertical plane.

FIG. 10 is an enlarged fragmentary sectional view taken on broken line 10—10 of FIG. 9 and showing track and roller chain means.

FIG. 11 is a diagrammatic view, partly in elevation and partly in section, illustrating some of the positions into which the boom and sickle bar and sickle assembly can be adjusted, the sickle bar and sickle assembly being diagrammatically shown.

FIG. 12 is a hydraulic diagram illustrating devices used for swingingly adjusting a turntable and boom about a vertical axis, a break-away valve of novel construction being shown in section.

Like reference numerals refer to like parts throughout the several views.

The chassis of the machine, somewhat diagrammatically shown in FIGS. 1 and 2, comprises a conventional truck or chassis frame 15 mounted on rear wheels 16 and front wheels 17 and provided toward its rear end with a cab 18. A suitable power unit is provided for driving the vehicle. This power unit may be mounted either on the rear end of the machine alongside of the cab 18, as illustrated diagrammatically by dot and dash lines 19 in FIG. 2, or it may be mounted in the usual manner on the front end of the chassis frame 15. If the power unit 19 is mounted alongside of the cab 18 and the front end of the chassis frame 15 is left clear and unobstructed then the boom structure and cutter bar and sickle assembly can be folded lengthwise of the machine for transportation purposes with the sickle bar and sickle assembly extending rearwardly over the cab 18, as shown in FIG. 1. If the driving unit for the truck or vehicle is mounted on the front end of the frame 15 then the boom and sickle bar and sickle unit are folded for transportation on the highway, alongside of the machine, as somewhat diagrammatically illustrated by full lines in FIG. 11. A combined power and hydraulic pump unit, shown diagrammatically by dot and dash lines in FIG. 2 and including a motor 20, is disposed alongside of the power unit 19 and is used as a source of hydraulic power for positioning and operating the cutter mechanism, as hereinafter described.

The boom mounting means comprises an upwardly extending turntable pedestal 21, FIGS. 1, 8 and 11, carried by and rigidly secured to the chassis frame 15 about midway between the rear wheels 16 and front end of the frame. A fixed horizontal disc 22 is rigidly secured to the upper end of the pedestal 21 and carries a downwardly extending bearing tube 23, FIG. 8, which extends into the pedestal 21. An upper rotatively movable turntable disc 24 rests on the fixed disc 22 and has an axially positioned downwardly extending tubular bearing member 25 rigidly connected therewith. The bearing member 25 is received and journaled within the bearing tube 23. A collar or hub 26 is clamped onto or otherwise rigidly secured to the lower end portion of the bearing member 25. A plate 27 is secured to the lower end of the bearing member 25 to complete the assembly. The collar 26 has a lever arm 28 rigid therewith and extending outwardly therefrom by which said collar 26 and disc 24 and all boom and boom control mechanism mounted on said disc 24 can be angularly moved. The collar 26 and plate 27 secure the bearing member 25 against upward movement in the bearing tube 23.

Rotary movement of the turntable disc 24 is provided by a hydraulic cylinder 30, FIGS. 2 and 12, having a piston rod 31 which is connected with the lever arm 28. The cylinder 30 is secured to the chassis frame 15. For clearance purposes the outer end portion 31' of the piston rod 31 is preferably curved to provide an offset relative to the lever arm 28, as shown in FIG. 12.

A boom mounting bracket which preferably has two upright spaced apart bracket members 32 is secured to the movable turntable disc 24. A boom carriage 33 is pivotally supported from the bracket members 32 by a horizontal pivot rod 34 which has its axis parallel to the disc 24.

Two opposite lateral edges of the boom carriage 33 are provided respectively with perforated bearing lugs 35 and 36. Two spaced apart parallel boom arms or members 37 and 38 are slidably received within the respective bearing lugs 35 and 36 and form the side members of a main boom. Preferably a bronze bushing 40, FIG. 6, is provided in each bearing lug 35 and 36 for the boom arm 37 or 38 to slide through, thus insuring smoothness and ease of movement and long wear.

The two main boom arms 37 and 38 extend through and are welded, as indicated by 39 in FIG. 6, or are otherwise rigidly secured to two cross bars 41 and 42. The cross bar 41 is an outer cross bar which extends across and connects the outer end portions of the main boom members 37 and 38, that is, the end portions of said members 37 and 38 remote from the boom carriage 33. The cross bar 42 is a medial cross bar disposed approximately midway between the two ends of said boom members 37 and 38. Parts 37, 38, 41 and 42 constitute a main boom herein referred to generally by reference character B. Boom arms 37 and 38 are of tubular construction.

An extension or outer boom, referred to generally as extension boom E comprises two spaced apart parallel tubular extension boom arms 43 and 44 connected with each other by cross bars 45 and 46. The extension boom E is telescopically and slidably supported from the outer end portion of the main boom B. The cross bar 45 is preferably in the form of a plate and its connects the outer ends of the extension boom arms 43 and 44 and serves as a mounting plate for sickle bar and sickle mechanism of a form hereinafter described. The cross bar 46 at the inner ends of boom arms 43 and 44 is slidably mounted, by bronze bushings 40, on the outer end parts of the main boom members 37 and 38 and is movable along said main boom arms 37 and 38 between the cross bars 41 and 42. The extension boom members 43 and 44 are slidably supported in the outer cross bar 41 by bushings 40. The extension arms 43 and 44 are secured to the cross bars 45 and 46 by welding as indicated at 39.

The main boom B is movable longitudinally relative to the boom carriage 33 between the fully retracted position shown in FIG. 3 and the fully extended position shown in FIGS. 4 and 5, by a double acting hydraulic cylinder 47 which has a piston rod 48. The piston rod 48 is connected by a bracket 50 with the medial cross bar 42 of the main boom B. The end of the hydraulic cylinder 47 shown at the right, FIG. 5, is secured to an extension bracket 51 which is rigid with and extends outwardly from the boom carriage 33.

The extension boom E is adapted to be moved longitudinally relative to the main boom B by a double acting hydraulic cylinder 52 which has a piston rod 53. The outer end of the piston rod 53 is connected by a bracket 54 with a bar 55. The bar 55 is rigid with and extends between the two cross bars 45 and 46 of the extension boom E. Said bar 55 thus serves as a longitudinal reinforcing and strengthening member for the extension boom E and as a means to which the piston rod 53 can be connected. The end of the hydraulic cylinder 52, shown at the right in FIGS. 3, 4 and 5, is connected with an extension bracket 56 which is secured to the fixed cross bar 42 of the main boom B.

The means for controlling the vertical swinging movement of the boom about the horizontal pivot rod 34 which mounts the boom carriage 33 comprises two upright double acting hydraulic lift cylinders 57 and 58 each having a piston rod 60. The upper end of each piston rod 60 is connected by a pivot member 61 with a bracket 62 which is rigid with the boom carriage 33. Each cylinder 57 and 58 is pivotally supported by pivot pins 63 from bearing bracket devices 64 which are rigidly secured to the rotatively movable turntable disc 24.

A cutter bar and sickle assembly is supported from the plate shaped cross bar 45 at the outer end of the extension boom E. This cutter bar and sickle assembly and the driving means connected therewith is preferably similar to that disclosed in previously mentioned Patent No. 2,588,003, and it will not be described in detail herein. In a general way this sickle bar and sickle assembly and the driving means associated therewith comprises a hydraulic motor 65 supported from the extension boom plate 45 by a bracket member 66, FIG. 3, and having a shaft 67. The shaft 67 is journaled in a bearing bracket 68 also supported from plate 45. A segment 70 of a sprocket wheel is rotatively mounted on an axis common to the motor shaft 67 and has a sickle bar support arm 72 rigidly secured thereto. Preferably two forwardly extending curved skid shoes are connected with the arm 72. One skid shoe 71 is rigidly attached to arms 72. The other skid shoe 76 is connected by pivot means 77 with arm 72. A diagonal brace member 73 has one end connected by a pivot bolt 74 to a bracket 75 which is supported from cross plate 45. The pivot bolt 74 is axially aligned with the shaft 67 of motor 65. The other or outer end of the diagonal brace 73 is secured to the sickle bar support arm 72. With the construction thus provided the sickle bar support arm 72 can be swingingly moved vertically about the axis of the motor shaft 67 by applying power to the sprocket wheel segment 70. A truss rod 78 connects the forward end of the skid shoe 76 with an upwardly extending part 76' of the sickle bar support arm 72. A sickle bar 80 is secured to the skid shoe 76 and a sickle 81 is supported for reciprocation by said sickle bar 80. A pitman 82 connects the sickle 81 with a crank disc 83 on the shaft 67.

A roller type sprocket chain 84 is secured to the sprocket wheel segment 70 and functions as a push-pull member for the purpose of swingingly raising and lowering the sickle bar 80 and sickle 81. The roller chain 84 operates between suitable guide tracks 85 and 86 which prevent buckling of said chain 84 and make it possible to exert a push with said chain. The uppermost guide track 85 extends for a substantial distance around the wheel segment 70 for the purpose of holding the chain 84 is engagement with the teeth of said segment 70 while a push is being exerted on said chain. A double acting hydraulic cylinder 87 has a piston rod 88 which is connected with the chain 84 whereby said chain 84 can be moved longitudinally to swingingly move the cutter bar and sickle assembly about the axis of shaft 67 and in a substantially vertical plane. The end of the cylinder 87 shown at the right in FIGS. 3, 4 and 5 is connected with a bracket 89 which is secured to and carried by the inner cross bar 46 of the extension frame E.

Telescopic tube conduit means, FIG. 3, is used in conducting oil under pressure to and from the hydraulic sickle driving motor 65. This telescopic conduit means comprises two side by side metal tubes 90 and 91 of larger diameter secured by bracket means 92 to the carriage 33 and two metal tubes 93 and 94 of smaller diameter telescopically disposed within the respective outer tubes 90 and 91 and communicatively connected at their outer ends with the motor 65. Packing glands 96 are provided to prevent leakage between the smaller tubes 93 and 94 and the larger tubes 90 and 91. Suitable conduits 97 connect the tubes 90 and 91 with a hydraulic pump 101 hereinafter described and shown in FIGS. 2 and 12. Only one of the conduits 97 is shown in FIG. 12.

The hydraulic devices for controlling rotary movement of the turntable disc 24 and thereby controlling horizontal swinging movement of the boom mechanism and sickle bar and sickle assembly are shown partly diagrammatically in FIG. 12. The remainder of the hydraulic control and operating mechanism is conventional and is not herein shown and described in detail.

Referring to FIG. 12, the motor 20 operates continuously while the machine is being used for cutting. Said motor 20 is connected by way of transmission means in a housing 100 with two hydraulic pumps 101 and 102. An oil reservoir 103 common to the two pumps is provided. The sole function of the pump 101 is to provide an adequate supply of oil under proper pressure to operate the sickle driving motor 65. The pump 102 provides a supply of oil under proper pressure to operate the several hydraulic cylinders 30, 47, 52, 57, 58 and 87. A valve assembly V, FIG. 2, disposed within the cab 18, provides an operator with convenient means for individually controlling each hydraulic operating device.

The double acting hydraulic swing cylinder 30 controls the swinging movement of the boom and sickle assembly and it is desirable to provide a means which will allow for some rearward swinging movement of the boom and sickle assembly relative to the chassis of the machine in the event the sickle assembly, while in use, encounters an obstruction, such as a rock or a stump or a branch or small tree, which the sickle can not cut through while moving at the same lineal speed as the chassis of the machine. This rearward swinging movement is ordinarily referred to as break-away movement. It minimizes damage to the machine and, in some instances, gives the operator time to act in stopping the machine after an obstruction is encountered and before damage is done. Also it allows for a lag or slower forward movement of the sickle while it cuts through heavier branches or the like as the machine moves forward at normal speed. This breakaway movement is obtained by interposing a break-away valve 108 of novel construction in a run of oil conduits 104, 105, 106 and 107, FIG. 12, which extends between the pump 102 and the end of the swing cylinder 30 shown at the right.

An operating control valve 99 for cylinder 30 is provided in conduits 104 and 105 between the pump 102 and the break-away valve 108. This operating valve 99 is diagrammatically shown in FIG. 12 but, in practice, it is one unit of the control valve assembly V, shown by dotted lines in FIG. 2. The pipes 105 and 107 are connected with each other by the passageway 106, which preferably extends through the body of the valve 108. Said valve body 108 is provided with four chambers 112, 113, 114 and 115. The chamber 112 is an oil pressure inlet chamber, the chamber 113 is a pressure control chamber, the chamber 114 is a pressure relief and outlet chamber and the chamber 115 is a control piston chamber. The chamber 112 contains a valve 116 urged against a seat 117 by a spring 118. A port 119 connects the oil flow passageway 106 with a portion of the chamber 112 on the opposite side of the seat 117 from the valve 116. The chamber 113 contains a check valve 120 urged against a seat 121 by a spring 122. The spring 122 is adjustably supported by a screw 123 having a lock nut 124 thereon. The chamber 114 contains a valve 125 which is urged against a seat 126 by a stem 127. The seat 126 has a port 126'. The seat 126 rests on a spacer ring or tube 128 and cooperates in forming a compartment 130 above said seat 126. A screw plug 131 closes compartment 130. The tubular ring 128 has perforations 129 in the walls thereof. The stem 127 extends from the chamber 114 downwardly into the control piston chamber 115 and a piston 132 is rigid with said stem 127 and operates in the chamber 115.

A passageway 135 connects the chamber 112 with the chamber 115. A second passageway 136 connects the chamber 115 with the chamber 113. A third passageway 137 of restricted size or area connects the chamber 113 with the chamber 114. This restricted passageway 137 will only permit a small amount of oil to flow through it. A conduit 138 connects the upper compartment 130 of the chamber 114 with the conduit 107. A check valve 107' is interposed in conduit 107 between the break-away valve 108 and the point of connection of conduit 138 with conduit 107 and checks return flow of oil from cylinder 30 to the conduit 106 in the lower portion of break-away valve 108. The oil pressure in compartment 130 of the break-away valve 108 is always the same as the oil pressure in cylinder 130 to the right of piston 30'. A return flow conduit 140 extends from the part of chamber 114 inwardly from the seat 126 back to the reservoir 103.

In the operation of the break-away valve 108, when the control valve 99 is opened as respects conduits 104 and 105 oil at normal pump pressure passes directly through conduits 104, 105 and 106 and by way of conduit 107 and check valve 107' to the forward end of swing cylinder 30. For this same position of the valve 99 the rear end of the cylinder 30, shown at the left FIG. 12, is connected through conduit 141, valve 99 and conduits 142 and 140 with the reservoir 103. A check valve 141' between conduits 141 and 140 allows the piston 30' in the cylinder 30 to draw in oil from return conduit 140 if it is moved to the right by rearward swinging movement of the boom and sickle assembly when the valve 99 is closed as respects conduit 141.

By opening valve 99 as respects conduits 104 and 105 the operator can move the boom and sickle assembly into a cutting position substantially at right angles to the frame 15, as shown in FIG. 2. When the valve 99 is in this position a limited amount of oil at pump pressure passes spring loaded check valve 116 and flows from chamber 112 through passageway 135 into chamber 115. This exerts pressure on piston 132, which pressure is determined by the adjustment of spring 122 against valve 120. This pressure against piston 132 is effective to help hold relief valve 125 closed thus preventing oil from bypassing from conduit 107 to reservoir 103 by way of conduits 138 and 140. This insures that oil at full pump pressure will pass to the cylinder 30. The pressure of spring 122 is adjusted by means of screw 123 so that while valve 99 is open as respects conduits 104 and 105 a small amount of oil will be spilled or bypassed from chamber 115 to the reservoir 103 by way of passageway 136, valve 120 in chamber 113, restricted passageway 137, chamber 114 and conduit 140.

After the boom and sickle assembly are in the cutting position at approximately right angles to the chassis frame 15 the control valve 99 is moved to a neutral position in which it is closed as respects conduits 104 and 105 and the oil is locked in the conduits 105, 106, 107 and the right or inner end of cylinder 30. The check valve 107' prevents surge pressure from feeding back to the chamber 112 of break-away valve 108. This surge pressure will vary depending on the amount of resistance encountered by the sickle assembly and the amount the boom is extended or length of lever arm by which the surge pressure is applied.

If the cutter bar strikes an obstruction while the vehicle is in motion or if the ground speed of the vehicle is too rapid to allow the cutter bar to cut through material it encounters the surge pressure created in cylinder 30, being greater than the locked in oil pressure in the break-away valve, is relieved by way of conduits 107, 138, chamber 130, valve 125 and conduit 140. When surge pressure opens valve 125 a small amount of oil from chamber 115 can escape past valve 120. Surge pressure must overcome the force of spring 133 and the locked in pressure against piston 132 before it can by-pass the valve 125. The spring pressed piston 132 operates both against the pressure of spring 133 and the locked in oil pressure which is determined by the adjustment of spring 122. Thus piston 132 modifies and governs the relief of surge pressure by way of valve 125.

During the cutting operation the sickle requires a variation in its lineal speed for cutting smaller and larger growth. The operator can move the vehicle forward at a constant speed, and at the same time, the break-away valve supplemented by the operators handling of the control valve 99 will allow the cutter bar to swing rearwardly for hard cutting and then be moved forwardly for easier cutting.

This weed and brush cutter is particularly well adapted for cutting weeds, grass and brush along highways. It can also be used to advantage to trim along railroad tracks by using a standard "railer" attachment with it or by replacing the rubber tires of wheels 16 and 17 with wheels suitable to run on rails.

If the motor 19 used to drive the vehicle is positioned alongside of the cab 18, as shown in FIG. 2, then the boom and sickle assembly can be positioned for transportation, either as shown in FIG. 1 with the sickle assembly above the cab 18, or as shown by full lines in FIG. 11 with the boom fully retracted and inclined downwardly and to one side of the frame 15 and the sickle assembly in a generally upright position.

The boom can be inclined downwardly at a fairly sharp angle and extended, as shown by the lower dot and dash line position in 11, to trim a bank which is sharply inclined downwardly from the roadbed. Also with the boom fully extended and inclined upwardly, as shown by uppermost dot and dash line position, FIG. 11, a long and high reach is provided and the sickle bar 80 can be pointed in a generally upward direction for trimming overhanging tree branches and the like.

The foregoing description and accompanying drawings clearly disclose a preferred embodiment of my invention but it will be understood that this disclosure is merely illustrative and that changes may be made within the scope of the following claim.

I claim:

In a mobile weed and brush cutter, a wheel supported vehicle frame; a turntable pedestal mounted on said frame; a horizontal turntable disc rotatively adjustably supported by said pedestal; boom mounting bracket means carried by said turntable disc; a boom carriage adjustably supported from said bracket means for vertical swinging movement about an axis parallel to said turntable disc, said boom carriage having spaced apart parallel tubular guide members; two spaced apart parallel main boom arms slidably disposed in said guide members of said boom carriage; an outer cross bar rigid with the outer end portions of said main boom arms, said outer cross bar having two transverse bearing openings therein inwardly from the respective main boom arms; a medial cross bar rigid with said main boom arms approximately midway between the two ends thereof; two parallel extension boom arms spaced apart a less distance than said main boom arms and slidably disposed within the transverse tubular bearing openings in said outer cross bar of said main boom arms; an inner cross bar rigid with the inner ends of said extension boom arms, the end portions of said inner cross bar having therein bearing openings which are slidable on the respective main boom arms; an outer extension arm cross bar rigid with the outer end portions of said extension boom arms; and a sickle bar assembly pivotally mounted for vertical swinging movement on said outer extension arm cross bar.

References Cited in the file of this patent
UNITED STATES PATENTS

| | | |
|---|---|---|
| 1,953,394 | Clapper | Apr. 3, 1934 |
| 1,958,405 | Anthony et al. | May 15, 1934 |
| 2,588,002 | Holmes | Mar. 4, 1952 |
| 2,588,003 | Holmes | Mar. 4, 1952 |
| 2,741,889 | Elfes | Apr. 17, 1956 |
| 2,880,562 | Vutz | Apr. 7, 1959 |